Figure 1:
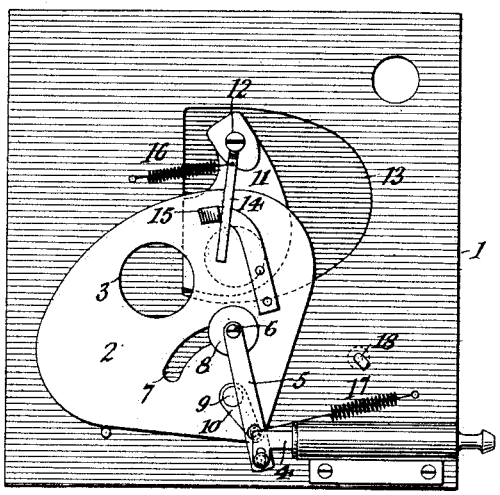

No. 622,611. Patented Apr. 4, 1899.
W. V. ESMOND.
PHOTOGRAPHIC SHUTTER.
(Application filed Mar. 30, 1898.)
(No Model.)

Witnesses:
Raphael Netter
Seabury C. Mastick

Inventor
William V. Esmond
by Ernest Hopkinson his Atty.

THE NORRIS PETERS CO., PHOTO-LITHO., WASHINGTON, D. C.

UNITED STATES PATENT OFFICE.

WILLIAM V. ESMOND, OF NEW YORK, N. Y., ASSIGNOR TO MAXIMILIAN KAHN, OF SAME PLACE.

PHOTOGRAPHIC SHUTTER.

SPECIFICATION forming part of Letters Patent No. 622,611, dated April 4, 1899.

Application filed March 30, 1898. Serial No. 675,719. (No model.)

*To all whom it may concern:*

Be it known that I, WILLIAM V. ESMOND, a citizen of the United States, residing at the city of New York, borough of Manhattan, county of New York, and State of New York, have invented a new and useful Improvement in Photographic Shutters, of which the following is a specification.

The present invention relates to photographic shutters, and is more particularly designed to be applied to that class of photographic shutters known as "pneumatic" shutters. It will be understood, however, that the invention is not limited in its application to pneumatic shutters alone, as it will be obvious that a hand-lever might be substituted for the pneumatic piston and the shutter operated by pushing the same over by hand.

By "pneumatic" shutters I mean those shutters which are operated by air-pressure alone as distinguished from those which are operated by spring-pressure and simply released by pneumatic action.

By my invention I provide a photographic shutter which may be used in any kind of camera, which is operated by pneumatic action, and is always set ready for operation.

I have illustrated in the drawings and will here describe a construction of photographic shutter embodying the principle of my invention; but it will be understood that the description and illustration are capable of modification in details without departing from the spirit of the invention, and it will be understood that I do not limit myself to the specific form described and shown.

Figure 2:
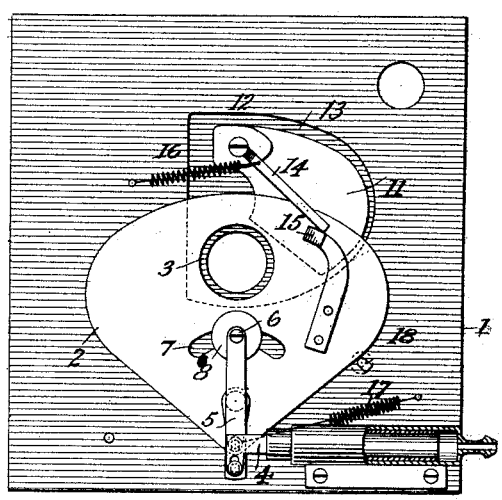
Figure 3:
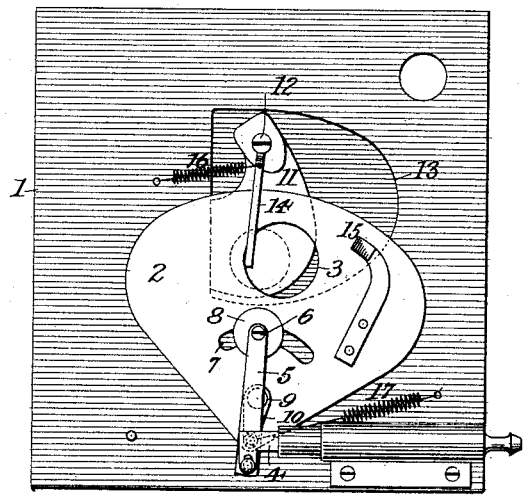
Figure 4:
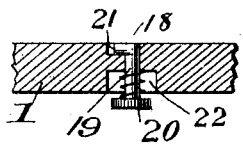

In said drawings, Figure 1 shows a rear elevation view of a front board of a camera to which my shutter is applied, the parts being shown as in the first position or ready to make the exposure. Fig. 2 is a view similar to Fig. 1, but shows the parts in the position of full exposure. Fig. 3 is a view similar to Figs. 1 and 2, but shows the parts in the position assumed at the termination of the exposure. Fig. 4 is an enlarged detail view showing the stop against which the shutter comes to rest when used for time exposure.

Like figures of reference refer to like parts throughout the several views of the drawings.

Referring to the drawings in detail, 1 designates the front board of the camera, upon which is pivoted the main wing 2, provided with the exposure-opening 3.

4 designates the pneumatic piston, to which is secured the arm 5, which is pivoted by a pin 6, projecting through an arc slot 7, cut in the wing 2. A washer 8 surrounds the pin 6 and rests upon the face of the wing 2, this washer serving as a guide and also tending to keep the wing 2 straight. The wing 2 is pivoted, by means of the pin 9, to the front board of the camera and has secured to it the crank-arm 10, the other end of which is secured to the lever-arm 5. In the operation of the wing 2 it will be seen that the pivoting of the arm 5 through the wing, whereby the length of the arm is materially increased, accomplishes a multiplication of the leverage on the wing 2, so that the movement of the piston 4 is accomplished by the application of a much less power applied through a longer range of movement than would be the case if the shutter were directly connected to the piston 4.

A supplemental or safety wing 11 is independently pivoted by the pin 12 in a recess 13, formed in the front board. Extending from this wing 11 is an arm 14, which is so shaped as to engage with a catch 15 on the upper surface of the wing 2. A spring 16 is secured at one end to the front board of the camera and at the other to the arm 14 and is designed to operate the supplemental or safety wing when the same is released from engagement from the main wing. A spring 17 is secured at one end to a pin on the front board of the camera and at the other to the lever-arm 5, constituting an additional means for returning the main wing 2 to first position after an exposure has been made. A movable stop 18 passes through the front board of the camera and is adapted to be thrust out to limit the length of movement of the main wing 2 when it is desired to use the shutter for time exposures.

The stop 18 consists of an extended piece secured to a stem 19, which is provided at its other end with a head 20. The stop 18 normally lies in a longitudinal recess 21 out of the path of movement of the shutter. When it is desired to operate for time exposure, the head 20 is pushed in a recess 22 and turned one-quarter way around, which causes the extended stop 18 to rest upon the opposed face of the front board to limit the range of movement of the shutter-wing.

The operation of the device is as follows: Assuming the parts to be in the position shown in Fig 1, where the wing 2 is shown as resting against the stop 23 in the first position, the application of air-pressure to the piston 4 by means of the usual bulb and tube will force the same out, thus carrying over the lever-arm 5, which oscillates the wing 2 by means of its connection through the crank-arm 10. At the same time the movement of the wing 2, by reason of the engagement of the catch 15 with the arm 14, opens the safety-wing 11 until the full exposure is made, when the parts are in the position shown in Fig. 2, further movement of the wing 2 releasing the catch 15 from engagement with the arm 14, thus permitting the spring 16 to return the safety-wing 11 to first position to close the opening and terminate the exposure. Upon relieving the piston 4 of air-pressure the natural expansion of air draws down the piston 4, so as to return the wing 2 to first position. To insure this return movement in all positions in which the camera may be used, I use a spring 17, connected to the arm 5.

If it is desired to make a time exposure, all that is necessary is to thrust the stop 18 so that it projects into the path of movement of the wing 2 and forms a stop against which the wing rests when it is moved to opening position, which is shown in Fig. 2. At the expiration of the period of exposure the air-pressure is relieved, and the wings 2 and 11 automatically return to close the lens-opening.

By these means it will be seen that I provide a pneumatic shutter which is always set, which requires a minimum amount of power to operate the same, which absolutely precludes any double exposure, and at the same time may be used for both time and instantaneous work.

What is claimed as new is—

1. In a photographic shutter the combination of a main wing and an independently-pivoted supplemental wing, means for engaging the two wings during the opening movement, and means for automatically returning the same, substantially as specified.

2. In a photographic shutter the combination of a main wing and an independently-pivoted supplemental wing, means for engaging the two wings during the opening movement, and means for automatically returning the wings independently of each other, substantially as specified.

3. In a photographic shutter the combination of a main wing provided with an exposure-opening, an operating lever-arm, a crank-arm secured to said wing and to the lever-arm, a supplemental or safety wing, means for engaging the two wings during the opening movement, and means for automatically returning the said wings, substantially as specified.

4. In a photographic shutter the combination of a main wing provided with an exposure-opening, an operating lever-arm, a crank-arm secured to said wing and to the lever-arm, a supplemental or safety wing, means for engaging the two wings during the opening movement, and means for automatically returning the wings independently of each other, substantially as specified.

5. In a photographic shutter the combination of a main wing provided with an exposure-opening, an operating lever-arm provided with a pivot extending through said main wing, a washer secured to said pivot, a crank-arm secured to said wing and to the lever-arm, a supplemental or safety wing, means for engaging the two wings during the opening movement, and means for automatically returning the wings independently of each other, substantially as specified.

In testimony whereof I have signed my name to this specification in the presence of two subscribing witnesses.

WILLIAM V. ESMOND.

Witnesses:
MAXIMILIAN KAHN,
SEABURY C. MASTICK.